(12) United States Patent
Armand (10) Patent No.: US 11,325,030 B2
(45) Date of Patent: May 10, 2022

(54) GAME PAD HOLDER FOR VIRTUAL REALITY VIDEO GAMES, COMPRISING A MECHANICAL FORCE FEEDBACK DEVICE

(71) Applicant: PROTUBEVR, Marseilles (FR)

(72) Inventor: Romain Armand, Marseilles (FR)

(73) Assignee: PROTUBEVR, Marseilles (FR)

( * ) Notice: Subject to any disclaimer, the term of this patent is extended or adjusted under 35 U.S.C. 154(b) by 0 days.

(21) Appl. No.: 17/276,566

(22) PCT Filed: Sep. 20, 2019

(86) PCT No.: PCT/FR2019/052207
§ 371 (c)(1),
(2) Date: Mar. 16, 2021

(87) PCT Pub. No.: WO2020/058649
PCT Pub. Date: Mar. 26, 2020

(65) Prior Publication Data
US 2022/0047940 A1 Feb. 17, 2022

(30) Foreign Application Priority Data

Sep. 20, 2018 (FR) ...................................... 1858508

(51) Int. Cl.
*A63F 13/285* (2014.01)
*A63F 13/98* (2014.01)

(52) U.S. Cl.
CPC ............ *A63F 13/285* (2014.09); *A63F 13/98* (2014.09)

(58) Field of Classification Search
CPC ........ A63F 13/285; A63F 13/24; A63F 13/98; A63F 2300/1043; A63F 2300/8082
See application file for complete search history.

(56) References Cited

U.S. PATENT DOCUMENTS 8,506,369 B2 * 8/2013 Grant ...................... A63F 13/06
463/2
8,888,595 B2 * 11/2014 Gregory ................ A63F 13/245
463/37

(Continued)

FOREIGN PATENT DOCUMENTS

CN 205607244 U 9/2016
EP 1 731 869 A1 12/2006

(Continued)

OTHER PUBLICATIONS

International Search Report dated Feb. 12, 2020 in corresponding International application No. PCT/FR2019/052207; 7 pages.

(Continued)

*Primary Examiner* — William H McCulloch, Jr.
(74) *Attorney, Agent, or Firm* — Maier & Maier, PLLC (57) ABSTRACT

A game pad holder for video games adapted to simulate a weapon, the holder has a mechanical force feedback device designed to simulate the recoil of the weapon at the moment of a trigger pressure during a game event, and the force feedback device includes: a casing in the form of a butt in physical contact with a zone of the body of the player, a firing pin forming a physical contact with the zone of the body of the player, and the firing pin is mounted mobile in the casing between: a folding position, and an advanced position to impact the zone of the body of the player. The device further includes a spring element, an actuator and an electronic management unit so that only pressure exerted on the firing pin the player allows to make the firing pin to pass from an advanced position to the folding position.

19 Claims, 5 Drawing Sheets

(56) References Cited

U.S. PATENT DOCUMENTS

| | | | |
|---|---|---|---|
| 9,174,134 B1 | 11/2015 | Grant et al. | |
| 9,180,365 B2* | 11/2015 | Torre | A63F 13/245 |
| 9,504,914 B2* | 11/2016 | Grant | A63F 13/06 |
| D780,807 S | 3/2017 | Chen et al. | |
| 10,155,159 B2* | 12/2018 | Jones | A63F 13/285 |
| D837,892 S* | 1/2019 | Armand | D21/333 |
| 10,198,074 B2* | 2/2019 | Grant | G06F 3/016 |
| 10,384,123 B2* | 8/2019 | Schmitz | G06F 3/016 |
| 10,518,172 B2* | 12/2019 | Chen | G06F 3/012 |
| 10,569,165 B2* | 2/2020 | Jones | A63F 13/533 |
| 10,852,093 B2* | 12/2020 | Monti | A63F 13/245 |
| 11,007,431 B2* | 5/2021 | Schmitz | A63F 13/24 |
| 2010/0167820 A1* | 7/2010 | Barakat | A63F 13/06 463/37 |
| 2010/0173686 A1* | 7/2010 | Grant | A63F 13/42 463/2 |
| 2011/0275435 A1* | 11/2011 | Torre | A63F 13/42 463/37 |
| 2016/0084605 A1* | 3/2016 | Monti | A63F 13/285 463/2 |
| 2016/0361637 A1 | 12/2016 | Higgins et al. | |
| 2017/0242486 A1* | 8/2017 | Grant | A63F 13/98 |
| 2017/0252643 A1* | 9/2017 | Chen | A63F 13/98 |
| 2017/0262048 A1 | 9/2017 | Webb et al. | |
| 2018/0050267 A1* | 2/2018 | Jones | A63F 13/28 |
| 2018/0345135 A1* | 12/2018 | Schmitz | G06F 3/0338 |
| 2021/0077912 A1* | 3/2021 | Armand | A63F 13/98 |

FOREIGN PATENT DOCUMENTS

| | | |
|---|---|---|
| EP | 1 900 404 A2 | 3/2008 |
| EP | 2 796 965 A2 | 10/2014 |
| JP | 2005-331188 A | 12/2005 |

OTHER PUBLICATIONS

The Protubevr Team. "Kit assembly tutorial", 2018; URL: https://docs.wixstatic.com/ugd/92fad4_67798185e84a44eaa4b06cf0e571e0c0.pdf; retrieved on Dec. 21, 2018; 4 pages.

* cited by examiner

GAME PAD HOLDER FOR VIRTUAL REALITY VIDEO GAMES, COMPRISING A MECHANICAL FORCE FEEDBACK DEVICE

TECHNICAL FIELD

The object of the invention is a game pad holder for virtual reality video games equipped with a mechanical force feedback device designed to simulate a physical impact during a game event.

It relates to the technical field of accessories for video games allowing to make game experiences even more immersive, in particular but not exclusively for virtual reality games such as three-dimensional (3D) shooting games.

BACKGROUND

Regarding video games, certain accessories (gamepads, controllers, joysticks) are equipped with force feedback devices. These devices simulate a physical impact during a video game event. They can, for example, simulate the recoil of a weapon at the moment of a trigger pressure during a shooting simulation in the game, or simulate the impact of an object or of an explosion on the body of the player.

These force feedback devices are sources of stimuli allowing a user to have the feeling of being immersed in the environment of the video game.

In an immersive virtual environment, virtual reality headsets allow the user to be immersed in a virtual scene of a video game, for example, by moving their head and their face, by making certain movements and by moving possibly within a limited radius.

A virtual reality headset is presented in the form of a mask covering the eyes of the user. A screen and glasses are placed a few centimeters in front of the eyes to display virtual images. Various sensors allow to detect the head and face movements of the user, which allows to adapt, in real time, the image projected on the screen, in order to produce the illusion of an immersion in the scene returned. These headsets are, for example, commercialized under the trademarks HTC VIVE®, OCULUS RIFT®, LENOVO®, or SAMSUNG ODYSSEY®.

In 3D shooting games, the image of a target or of an enemy displayed on the screen of the headset must be hit by a bullet. The sight and shooting of the target is done by means of at least one controller, or gamepad, held by the player. These controllers generally operate in pairs, one in each hand of the user.

These controllers generally comprise a joystick or touchpad for the movements of the player in the virtual environment, one or more buttons and/or triggers allow to trigger actions in this environment and in particular the picking up/putting down of objects, taking photos, aiming, shooting, etc. Different movement and/or position sensors are disposed on a crown integral with the stick of the controller. They are, for example, commercialized by the company OCULUS® under the trademark OCULUS TOUCH® or by the company VIVE®. Patent documents U.S. D 780807, US2017262048 or also US2016361637 also disclose this type of controller.

The controllers are monitored in the space by means of different sensors/transmitters (disposed on the controllers and/or headset and/or in the room where the game is taking place), such that the user can interact with the virtual environment, as with their own hands. Various techniques allow to synchronize the images projected on the screen of the headset with the position of the controllers. These techniques do not form the subject of the present invention and will therefore not be described here. The same goes for the techniques of transmitting data between the headset, the controllers and the central unit allowing the implementation of the video game.

The handling of the controllers during a game significantly affects the experience of the game insofar as the players are bound to play with speed and precision with respect to an action. Each detail which reminds the brain of the player that this is a virtual reality is likely to interfere with their feeling of immersion and their experience. If current controllers allow to effectively simulate the holding of an object in each hand (for example, a handgun, a knife, a stick, etc.), the result is not as good when it comes to simulating the holding of an object which is held with both hands (for example, an assault rifle, a sword, a golfclub, a fishing rod, etc.).

In the field of shooting games, complex and expensive reproductions of assault rifles such as those described in patent document EP1900404 or those commercialized under the trademarks DELTA SIX® or STRIKER VR® are known.

Some of these imitation weapons integrate a force feedback device, for example assault rifles commercialized by the company VRSENAL® under the reference VR-15®. In this type of product, the force feedback device is integrated in the butt of the rifle. A firing pin, moved by an actuator, hits the inner wall of the butt. The firing pin and the actuator thereof must be designed such that this impact transmits a sufficient pressure to the player to simulate the recoil of the weapon at the moment of a trigger pressure. This constraint involves using a force feedback device of which the size is relatively large and of which the cost is high.

The weapons described in patent documents JP2005331188, CN205607244 or US2011/0275435 integrate a force feedback device including a firing pin, moved by an actuator, and forming, in use, a physical contact with the zone of the body of the player. The firing pin could be moved at any moment, there is a risk that it may unintentionally impact the body of the player and/or another piece of equipment, in particular a virtual reality headset.

The invention aims to overcome the abovementioned technical problems. In particular, the aim of the invention is to propose a game pad holder including a force feedback device which is compact and/or of which the size is reduced.

Another aim of the invention is to propose a game pad holder including a force feedback device which is particularly comfortable for the user.

Also, another aim of the invention is to propose a game pad holder including a force feedback device allowing to improve the perception of the player during the simulation of a physical impact.

Also, another aim of the invention is to propose a game pad holder including a force feedback device of which the design is simple, inexpensive and easy to use.

SUMMARY

The solution proposed by the invention is a holder for game pad for virtual reality video games, which holder is adapted to simulate a weapon in said game, which holder is equipped with a mechanical force feedback device designed to simulate the recoil of the weapon at the moment of a trigger pressure during a game event, the force feedback device includes:
- a casing which, in use, is in physical contact with a zone of the body of the player, which casing is presented in the form of a butt shaped to be worn on their shoulder by a player,
- a firing pin forming, in use, a physical contact with the zone of the body of the player, and wherein:
the firing pin is mounted mobile in the casing between:
- a folding position, and
- an advanced position, where said firing pin projects from said casing to, in use, impact the zone of the body of the player,
- a spring element is arranged to hold the firing pin in advanced position when the casing is not in physical contact with the zone of the body of the player,
- an actuator is arranged to move the firing pin between the folding position and the advanced position,
- an electronic management unit is adapted to receive signals and, in response to the reception of said signals, control the actuator so as to only exert thrust pressures on the firing pin, which thrust pressures allow to make said firing pin pass from the folding position to the advanced position,
- in use, only the pressure exerted on the firing pin by the zone of the body of the player allows to make said firing pin pass from the advanced position to the folding position.

The firing pin now directly impacts the zone of the body of the player. Therefore, there is a direct physical contact between the firing pin and the body of the player, contrary to certain devices of the prior art where at least one wall forms the interface between said firing pin and said body. For an equivalent perception, the impact force of the firing pin and the course thereof can be decreased, such that the actuator can be of a more reduced size. The device according to the invention is thus more compact and less expensive than those known from the abovementioned prior art. In addition, the control method has several advantages. The management unit must only manage the release of the firing pin such that the computer resources necessary for this management are reduced. Furthermore, when the butt is not on the shoulder, the firing pin is not pushed back to the folding position, the spring holding said firing pin in advanced position. Therefore, even if the management unit controls the actuator such that this exerts a thrust force, the firing pin will not move and will remain in advanced position. This is particularly comfortable for the player insofar as the firing pin does not move when the butt is not on the shoulder correctly. Therefore, there is no risk that the firing pin unintentionally impacts another zone of the player and/or another piece of equipment.

Other advantageous features of the invention are listed below. Each of these features can be considered individually or in combination with the noteworthy features defined above and form the subject of, if necessary, one or more divisional patent applications:

According to an advantageous embodiment, in the folding position, the firing pin is retracted in the casing such that a front face of said firing pin is located in the same plane as the surface of a rear portion of the butt against which, in use, the shoulder of the player is flattened.

Advantageously, the firing pin is provided with one or more abutment elements blocking the movement of said firing pin when it reaches the advanced position.

Advantageously, the abutment element(s) is/are made of a rigid material and shuts against a rear wall of the butt when the firing pin reaches the advanced position.

According to an embodiment, the electronic management unit is adapted to detect the leading edges of the signals received by said unit and determines, according to a predefined configuration, the activation period of the actuator.

According to an embodiment, the configuration of the activation period can depend on the amplitude of the signals received by the electronic management unit, and possibly of the frequency of said signals.

Advantageously, the firing pin is mounted mobile in translation between the folding position and the advanced position.

In an embodiment variant, the firing pin is mounted mobile in rotation between the folding position and the advanced position.

Advantageously, the device includes at least one of the following features: the actuator is controlled to exert a thrust force comprised between 10 N and 100 N; the articulation of the firing pin between the folding position and the advanced position is comprised between 1 mm and 5 mm; the actuator is an electro-piston.

According to an embodiment, the holder is presented in the form of a stick, the butt being removably fixed onto said stick.

Also, another aspect of the invention not covered by the claims relates to a virtual reality video games accessory integrating at least one force feedback device according to one of the preceding features.

BRIEF DESCRIPTION OF THE FIGURES

Other advantages and features of the invention will appear better upon reading the description of a following preferred embodiment in reference to the appended drawings, made as indicative and non-limiting examples, and wherein.

DETAILED DESCRIPTION OF THE EMBODIMENTS

The invention implements one or more computer applications executed by the force feedback device. For clarity, it must be understood, in the sense of the invention, that "the device does something" means "the computer application executed by the processor or microprocessor of the device does something". Just like "the computer application does something" means "the computer application executed by the processor or microprocessor of the device does something".

Also for clarity, the present invention can make reference to one or more "logical computer processes". The latter correspond to the actions or results obtained by the execution of instructions of different computer applications. Also, it must also be understood in the sense of the invention that "a logical computer process is adapted to do something" means "the instructions of a computer application executed by a processor or microprocessor do something".

Also for clarity, the following precisions are applied to certain terms used in the description and the claims:

"Computer resource" can be understood in a non-limiting manner, as: component, equipment, software, file, connection to a computer network, quantity of RAM, hard disk space, bandwidth, processor speed, CPU number, hardware, etc.

"Software" can be understood as: computer application, computer program or software.

"Electronic management unit" can be understood in a non-limiting manner, as: processor, microprocessor, CPU (Central Processing Unit).

"Video game" can be understood as an electronic game provided with a user interface allowing a fun or non-fun human interaction (e.g. shooting training simulation) by generating a visual return on a video device (screen, headset, glasses, etc.).

"A and/or B" means: only A or only B or A+B.

The force feedback device according to the invention is intended to be equipped with a video game accessory. This accessory can be a controller (game controller), a game pad holder (simulating a weapon such as a pistol, an assault rifle or a sword, a golfclub, a tennis racket, a fishing rod), an item of clothing, etc.

The device allows to simulate a physical impact during a virtual or non-virtual video game event. It allows, for example, to simulate the recoil of a weapon at the moment of a trigger pressure (e.g. in the case of a pistol or of an assault rifle), a contact with another virtual object (e.g. a contact with the sword of an enemy or with a golf or tennis ball, the catching of a fish with a fishing rod, etc.), a bullet impact (e.g. in the case of an item of clothing integrating one or more force feedback devices).

For clarity and conciseness, below the description describes the force feedback device associated with a controller support. The same force feedback device can of course be integrated in another video game accessory.

Figure 1:
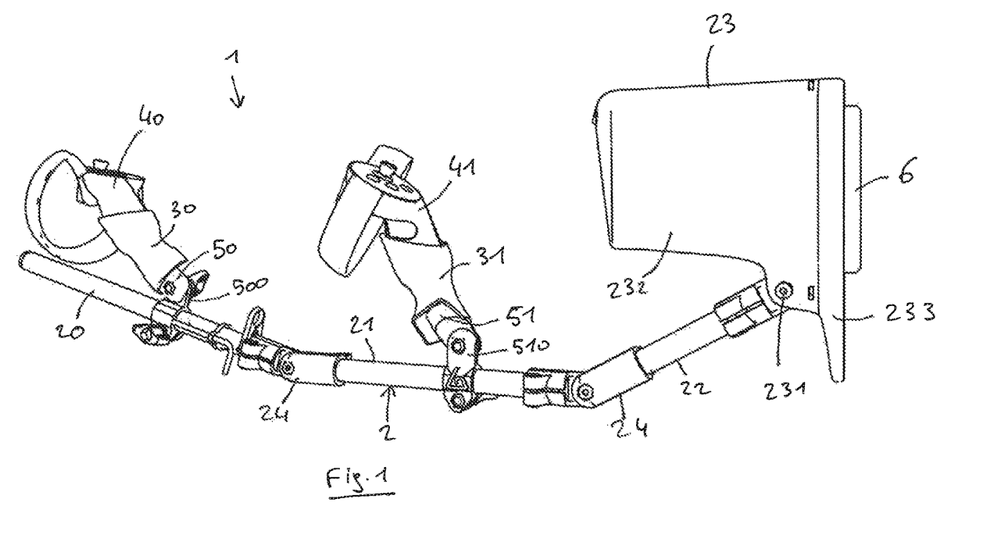
FIG. 1 is a perspective view of a game pad holder according to the invention, the firing pin being in advanced position.
Figure 2:
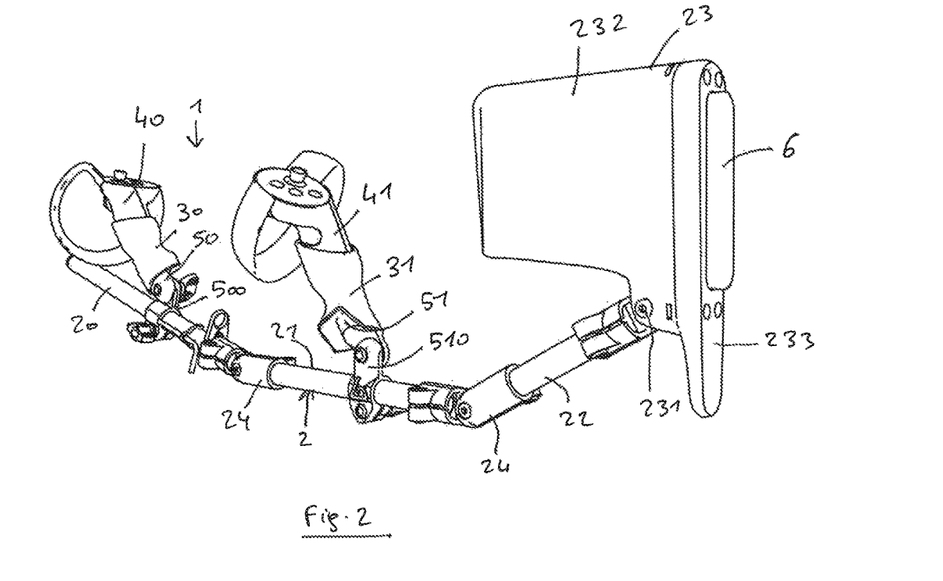
FIG. 2 is another perspective view of the game pad holder of FIG. 1.

In FIGS. 1 and 2, the game pad holder 1 is presented in the form of a stick. This stick 2 simulates an object in a video game virtual environment, in particular a rifle, but also other objects such as a handgun, sword, stick, golfclub, fishing rod, etc. In other words, the stick 2 forms a virtual simulated object. In a virtual reality environment, the player does not see what they have between their hands. A single holder allowing to hold controllers aligned appears fully sufficient.

The stick 2 can be straight, curved or be presented in the form of a broken line. It has, in particular, the function of physically connecting the controllers together and to hold them in a certain alignment.

According to the preferred embodiment illustrated in FIGS. 1 and 2, the stick 2 has four portions 20, 21, 22, 23 articulated together: a front portion 20, a middle portion 21, a rear portion 22 and a butt 23. An advantage linked to the use of an articulated stick 2 is that this can be easily folded, and that in this folded state, the holder 1 has a reduced size such that it can be easily stored and/or transported. Furthermore, the player has the possibility to shape the stick 2 to adapt it to the morphology thereof and/or to the type of virtual simulated object used in the video game.

The front 20, middle 21 and rear 22 portions are advantageously presented in the form of rigid tubes, made of metal, plastic, wood, carbon, etc. The tubes can be cylindrical, of round, oval, square, rectangular, etc., cross-section. The length thereof is, for example, comprised between 15 cm and 30 cm and the outer diameter thereof, for example, comprised between 1 cm and 5 cm. These portions can have the same length or different lengths.

The portions 20, 21 and 22 are advantageously connected together by means of articulated tube connectors 24 with two junctions. These connectors 24 each form a horizontal axis pivot connection. The articulations of the connectors 24 are preferably notched such that the player can adjust the shape of the stick 2 to suit, then lock the portions 20, 21 and 22 in position once the shape is made.

The butt 23 can be made of the same material as the articulated portions 20, 21, 22, 23 or of a different material. To simplify the design thereof, it is obtained by plastic molding. In FIGS. 1 and 2, this butt 23 is mounted on an articulation 231. The main body 232 of the butt 23 is oriented along the same direction as the stick 2, to the front portion 20. The rear portion 233 is intended to abut against the shoulder of the player and the branch 232 forms a cheek holder particularly useful for the player when they want to adjust a shot.

The articulation 231 forms a horizontal axis pivot connection enabling a rotation of the butt 23 with respect to the axis of the stick 2. Here, "axis of the stick" means the longitudinal axis of the stick 2 when it is rectilinear, or the longitudinal axis of the rear portion 22 when said stick is not rectilinear. The articulation 231 is presented preferably in the form of a notched articulation allowing the player to adjust the inclination of the butt 23 to suit, then to lock it in position once this adjustment is made. In any case, the butt 23 is removably fixed onto the stick 2 such that the player can remove it or change it if needed.

The holder 1 is provided with two housings 30, 31 adapted to each receive a controller 40, 41. These housings 30, 31 can be made of metal, plastic, carbon, etc. In FIGS. 1 and 2, they are disposed on the front 20 and middle 21 portions of the stick 2.

The controllers 40, 41 are of the known type. They generally comprise a joystick or touchpad for the movements of the player in the virtual environment, one or more buttons and/or triggers allowing to trigger actions in this environment and in particular, the picking up/putting down of objects, taking photos, aiming, shooting, etc. Different movement and/or position sensors are disposed on a crown integral with the handle of the controller. They are, for example, commercialized by the company OCULUS® under the trademark OCULUS TOUCH® or by the company VIVE®. Patent documents U.S. D 780807, US2017262048 or also US2016361637 also disclose this type of controller. A person skilled in the art can refer to these documents if needed.

Each housing 30, 31 has the shape of a bowl or plate wherein the handle of the controller 40, 41 is interlocked. This interlocking is done along the axis of the handle, and generally according to a movement from top to bottom. The inner dimensions of the housing 30, 31 are adjusted to those of the handle such that said handle is held in position quite firmly. The inner dimensions of the housing 30, 31 are adapted to the controller model used by the player (VIVE®, OCULUS RIFT®, ACER®, LENOVO®, and SAMSUNG®, HP®, DELL®), such that the handle is engaged with an adjustment clamped in said housing 30, 31. Therefore, one specific housing per controller model can be provided. To improve the holding in position of the handle in the housing 30, 31. The inner walls of the latter are advantageously covered with a coating of the rubber or silicone type, ensuring an additional adherence.

Each housing 30, 31 is integral with the stick 2 by way of a pin 50, 51 These pins 50, 51 project to the top of the stick 2 such that said stick is positioned under the controllers 40, 41. The sensors/transmitters carried by the crowns are thus perfectly uncovered when the controllers 40, 41 are slotted in the respective housing 30, 31, no element of the holder 1 concealing them.

Advantageously, each pin 50, 51 is mounted on an articulation 500, 510 enabling a rotation of the housing 30, 31 in a plane passing through the axis of the stick 2, and actually a rotation of the controller 40, 41. Here, "axis of the stick" means the longitudinal axis of the stick 2 when it is rectilinear or when said stick is not rectilinear, the longitudinal axis of the portion 20, 21 on which the housing 30, 31 is disposed. The player thus has the possibility to adjust precisely, the inclination of each controller 40, 41, for example to optimize the precision of a shot.

Advantageously, the housings 30, 31 can be gripped and are removably engaged on the pins 50, 51. To disengage a controller 40, 41 of the stick 2, the player must thereof handle it by holding the housing wherein it is slotted, which housing is thus substituted for the handle of said controller. To improve the gripping of the housings 30, 31, the outer wall thereof can be shaped ergonomically to be adapted to the hand of the player. Preferably, it is a magnetic connection exerting a magnetic force which ensures the holding in position of the housing 30, 31 on the pin 50, 51.

Figure 3:
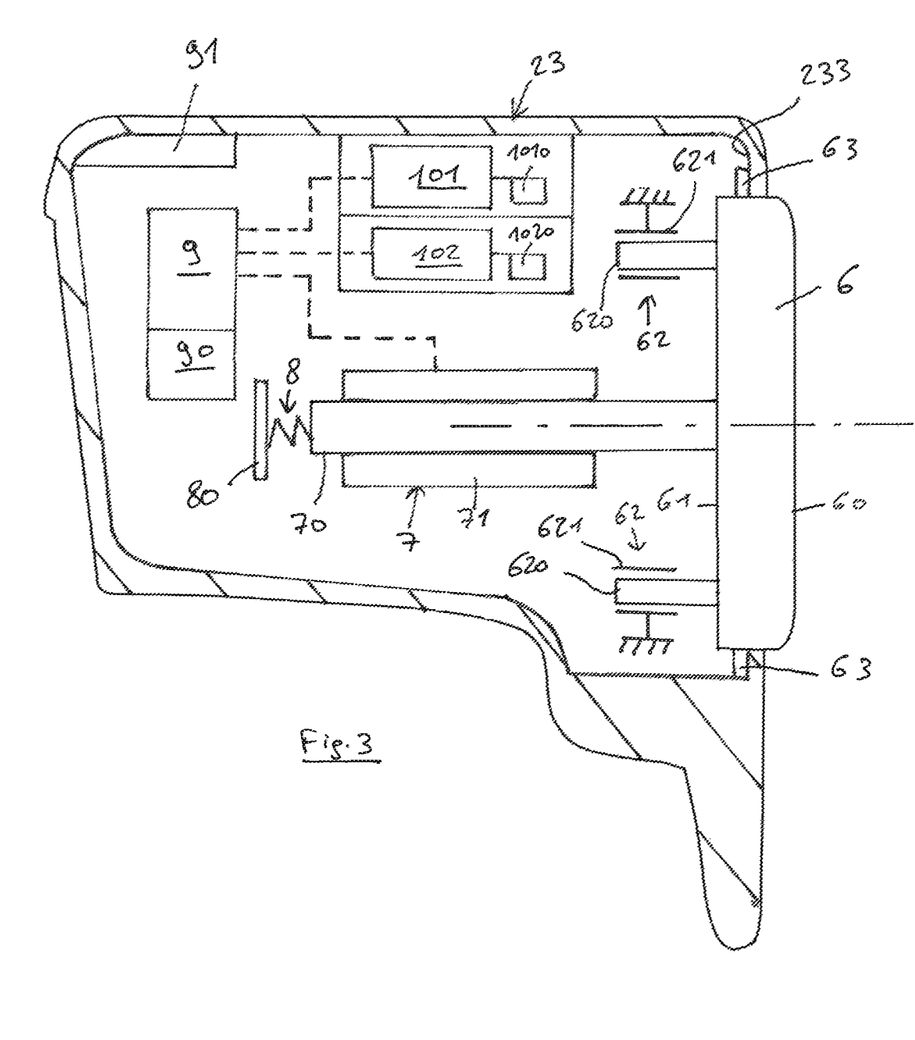
FIG. 3 is a schematic view of a force feedback device according to the invention, the firing pin being in advanced position.
Figure 4:
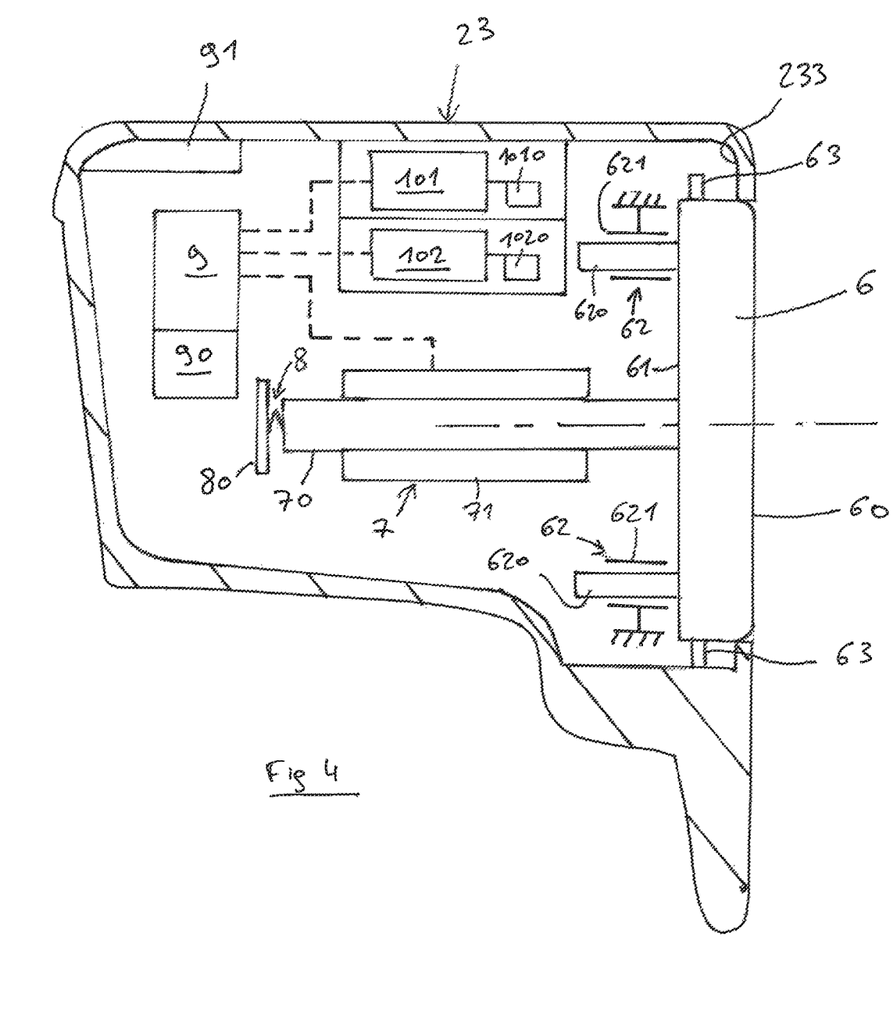
FIG. 4 shows the force feedback device of FIG. 3 with the firing pin in folded position.

By referring to FIGS. 3 and 4, the butt 23 forms a casing wherein the different elements of the force feedback device are housed. The butt 23 is shaped to be worn on their shoulder by a player. In use, it is therefore in physical contact with a zone of the body of the player, which zone here is the shoulder. Here, "physical contact" means a contact with the skin of the player or a contact with one or more items of clothing worn by them.

According to the invention, a firing pin 6 is mounted mobile in the butt 23 between: —a folding position (FIG. 4) and; —an advanced position (FIGS. 1 to 3), where it projects from said butt to physically impact the shoulder of the player.

To simplify the design and to reduce the costs, the firing pin 6 has a general rectangular shape. It has a front face 60 and a rear face 61. The front face (or active face impacting the zone of the body of the player) is preferably flat, but can be convex and/or have one or more elements in relief shaped so as to improve the perception of the player during the impact of the firing pin 6 on their shoulder. As an example, the firing pin 6 has a length comprised between 1 cm and 15 cm, a width comprised between 5 mm and 3 cm and a height comprised between 5 mm and 2 cm. The firing pin 6 is made by molding or plastic injection of PETG, PLEA, ABS type, etc. It can however be made of metal or of a more flexible rubber-type material so as to dampen the impact.

The firing pin 6 is inserted in a complementarily-shaped housing arranged in the butt 23. This housing has an opening, opening outside of the butt 23 and by which the firing pin 6 releases to the advanced position.

The firing pin 6 is provided with one or more abutment elements 63 blocking the movement of said firing pin when it reaches the advanced position. These abutment elements 63 come into contact with the rear wall 233 of the butt 23. In FIGS. 3 and 4, the abutment elements 63 are disposed on the lateral faces of the firing pin 6, and can consist of returned parts or, on the contrary, be directly molded or machined on the main body of said firing pin. The abutments 63 can be made of a rigid material, of PETG, PLEA, ABS type, etc. This allows to hear the abutments 63 "shut" against the rear wall 233 when the firing pin reaches the advanced position, this shutting being an additional source of auditive stimulus for the player. On the contrary, if this shutting is not desired, the abutments 63 and/or the contact zone of the rear wall 233 can be made of a flexible material of the rubber type.

In the appended figures, the firing pin 6 is arranged in the rear portion of the butt 23, i.e. that against which the shoulder of the player is flattened. In the folding position, the firing pin 6 can be retracted in the butt 23, such that the front face thereof is located in the same plane as the surface of this rear portion. In this folding position, it can however be considered that the firing pin projects from the butt 23, the front face thereof exceeding the surface of the rear portion of said butt. The latter configuration is particularly advantageous insofar as when the player puts the butt 23 on their shoulder, the firing pin 6 is the first element that it urges, making it pass from the advanced position to the folding position.

In the advanced position, the front face 60 is located beyond the surface of the rear portion of the butt 23 so as to be able to physically impact the shoulder of the player.

To further simplify the design, the firing pin 6 is mounted mobile in translation between the folding position and the advanced position. A translation movement is indeed the simplest to manage and allows to use solutions which are technically easy to implement. One or more guiding means 62 ensure the guiding of the firing pin 6. The rear face 61 of the firing pin 6 can, to this end, be provided with one or more cylindrical elements 620 mounted sliding in complementary housings 622 arranged in the butt 23, the assembly forming a slider.

An actuator 7 ensures the movement of the firing pin 6 between the folding position and the advanced position. This actuator 7 is preferably an electro-piston. This type of linear actuator is particularly compact, reliable and robust, offers a short response time, and allows to generate a thrust force matching the impact effect sought. In FIGS. 3 and 4, the electro-piston 7 includes a piston (or armature) 70 sliding in the body of a complementarily-shaped magnetic coil 71. The body of the coil 71 is fixedly connected to the butt 23 and surrounds the piston 70. The supply of the coil 71 leads to the movement by sliding of the piston 70. The latter is integral with the firing pin 6, at the level of the rear face 61 thereof. Due to this, the movement of the piston 70 leads to the movement of the firing pin 6. The coil 71 can be controlled or adjusted by voltage or by current.

Generally, the actuator 7 is controlled by an electronic management unit 9. The latter transmits control information allowing to control the actuator 7 to generate at least one thrust force which is applied to the firing pin 6. Between the folding position of the advanced position, this thrust force is advantageously comprised between 10 N (Newtons) and 100 N. The applicant has been able to observe that beyond 10 N, the perception of the player during the simulation of a physical impact was insufficient. And beyond 100 N, the firing pin 6 risks injuring the player and/or forming a bruise.

The butt 23 advantageously integrates a battery 91, such as a lithium battery or a solar battery, which ensures the electric supply of the components of the force feedback device. This electric supply can however be directly ensured by a cable connected to the mains or directly to a virtual reality headset.

In the case where the actuator 7 is an electro-piston, the management unit 9 controls the supply of the coil 71. It can be an all-or-nothing-type control or an adjusted-type control of the Pulse Width Modulation (PWM) type.

The applicant has also observed that the best results in terms of perception are obtained when the articulation (or course) of the firing pin 6 between the folding position and the advanced position was comprised between 1 mm and 5 mm Beyond 1 mm, the player does not practically feel the physical impact of the firing pin 6 (particularly when they are wearing clothes) and beyond 5 mm, said firing pin is engaged too deeply in the zone of the body of the player at the risk of impeding them and/or injuring them.

A spring element 8 is arranged to maintain the firing pin 6 in advanced position, when the butt 23 is not on the shoulder, or, more generally, when the casing 23 is not in physical contact with a zone of the body of the player. The firing pin 6 is thus naturally in advanced position, that the actuator 7 is or not activated. In FIGS. 3 and 4, the spring element 8 is presented in the form of a helical spring, on the one hand, connected with the rod of the piston 70 and, on the other hand, connected with an abutment element 80. The spring 8 is arranged to act in the axis of the piston 70 (and therefore, in the direction of movement of the firing pin 6), such that the abutments 63 are held in abutment against the rear wall 233 of the butt 23. In this configuration, when the player put the butt 23 on their shoulder, their shoulder exerts a pressure on the firing pin 6 which pushes back said firing pin in folding position. When the butt 23 is not worn on the shoulder, the spring 8 returns the firing pin 6 in advanced position. The abutment element 80 can have an adjustable position so as to be able to modify the course of the piston 70 and therefore that of the firing pin 6. The abutment element 80 can be made of a rigid material (e.g. PETG, PLEA, ABS, etc.) or flexible material (e.g. rubber). One of the advantages linked to the use of a flexible material is to be able to reduce (or stifle) the noise of the piston 70 when it is in a recoiled position and abuts against said element 80. This recoiled position of the piston 70 corresponds to the folding position of the firing pin 6.

The management unit 9 integrates a communication module 90 adapted to receive radiofrequency signals wirelessly transmitted from a games console or from a PC used to play the video game. The radiofrequency signals can also come from a dedicated electronic interface connected to this games console or this PC. The radiofrequency signals can also come from gamepads and in particular, controllers 40, 41. These signals are transmitted during video game events, such as a shot coming from a virtual weapon, or a virtual exposure in the proximity of the player. With the aim of simplifying the design of the communication module 90, the radiofrequency signals received are preferably signals using a Bluetooth protocol. However, other protocols such as: ISM, Wi-fi, ANT, ZIGBEE, Infrared, etc. could be used.

In an embodiment variant, the management unit 9 is directly connected in a wired manner with the games console, the PC, the dedicated interface, the games controllers, the virtual reality headset and receiving signals from these devices.

In response to receiving signals, the management unit 9 controls the actuator 7. The management unit 9 detects the leading edges of these signals and determines, according to a predefined configuration, the activation period of the actuator 7.

Figure 6:
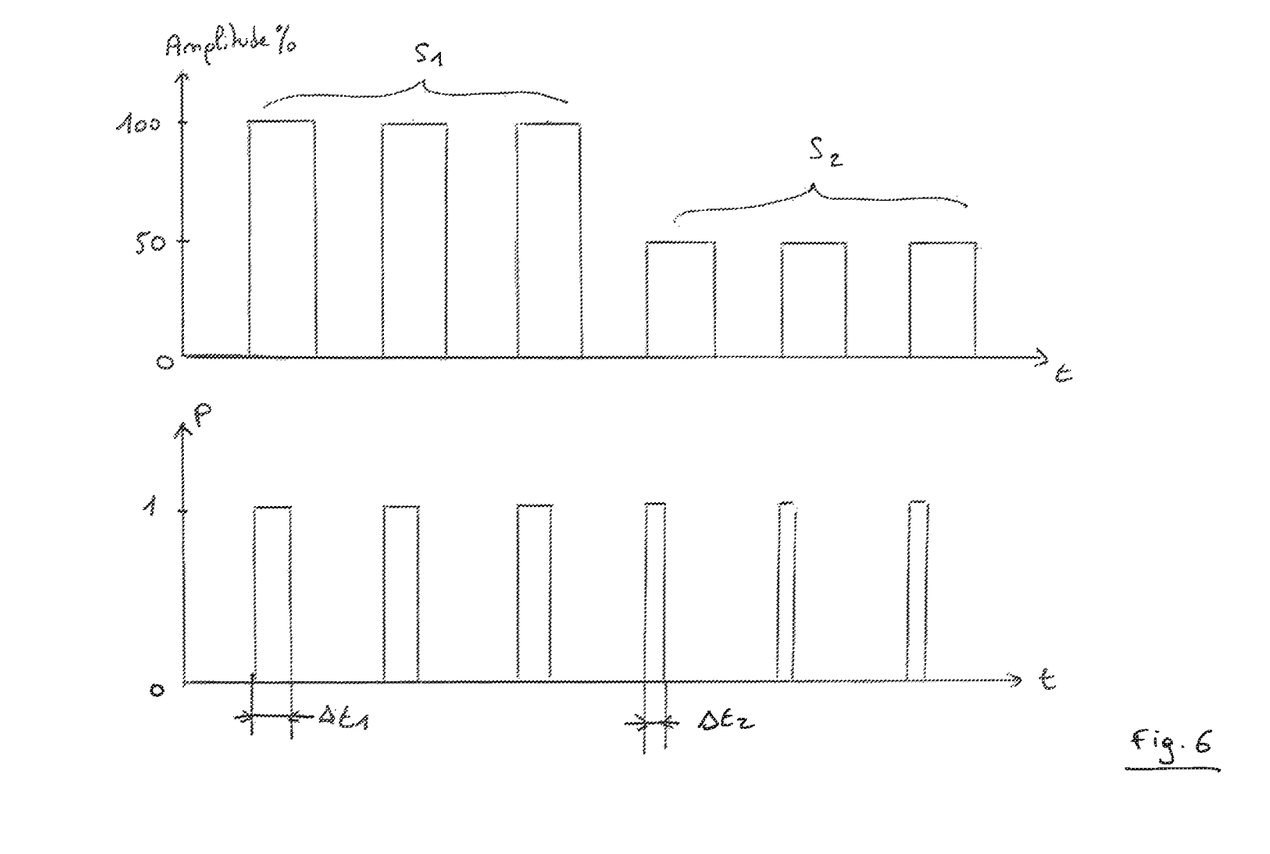
FIG. 6 is a diagram showing an example of strategy for controlling the actuator according to the signals received.

FIG. 6 illustrates an example of a strategy of controlling the actuator 7 according to the signals received by the management unit 9. The diagram on the top shows an example of signals received by the management signal 9. The ordinates correspond to the amplitude of the signals received (0%-100%) and the abscissas correspond to time. The diagram on the bottom illustrates the notes for controlling the actuator 7 which are transmitted by the management unit 9. The ordinates correspond to the activation of the actuator (0-1) and the abscissas correspond to time.

By referring to the diagram on the top, a first series S1 of signals is received by the management unit 9. This first series corresponds to a first game event (e.g. use of a large virtual machine gun). These signals have an amplitude of 100%. The management unit 9 determines, for example, that the activation period $\Delta t1$ is 0.80 ms when the amplitude of the signal is 100%.

The signals of the second series S2 have an amplitude of 50%. This second series corresponds to a second game event (e.g. use of a small virtual machine gun). The management unit 9 determines, for example, that the activation period $\Delta t2$ is 0.30 ms when the amplitude of the signal is 50%.

The applicant has observed that the duration of the activation period $\Delta t$ of the actuator 7 is proportional to the value of the thrust force. In the case above, as $\Delta t1 > \Delta t2$, the thrust force of the actuator 7 is greater when the management unit receives signals from the series S1 than that obtained with signals from the series S2. The force of the impact perceived by the player therefore varies according to the nature of games events.

The configuration of the activation period here depends on the amplitude of the signals received by the management unit 9. However, it can be considered to consider one or more other parameters of these signals, such as the frequency thereof, for example.

The actuator 7 is advantageously controlled to only exert a thrust pressure on the firing pin 6 (at a determined frequency) to make it pass from the folding position to the advanced position, and it is the pressure exerted on the firing pin 6 by the zone of the body of the player (the shoulder in the case of the butt 23) which allows to make said firing pin pass from the advanced position to the folding position. This control method has several advantages. The management unit 9 must only manage the release of the firing pin 6 (and not the re-entry thereof) such that the computer resources necessary for this management are reduced. Furthermore, when the butt 23 is not worn on the shoulder, the firing pin 6 is not pushed back to the folding position, the spring 8 holding said firing pin in advanced position. Therefore, even if the management unit 9 controls the actuator 7 such that this exerts a thrust force, the firing pin 6 will not move and will remain in advanced position. This avoids the player hearing and/or perceiving the abutments 63 "shutting" against the rear wall 233 when the butt 23 is not worn on the shoulder. This is also more comfortable for the player insofar as the firing pin 6 does not move when the butt 23 is not worn on the shoulder correctly. Therefore, there is not any risk that the firing pin 6 unintentionally impacts another zone of the body of the player and/or another piece of equipment, in particular their virtual reality headset.

In an embodiment variant not covered by the claims, it can however be considered that the actuator 7 exerts not only a thrust pressure on the firing pin 6 to make it pass from the folding position to the advanced position, but also a shooting pressure to make said firing pin pass from the advanced position to the folding position.

As illustrated in FIGS. 3 and 4, the butt 23 can also integrate one or more vibrating actuators 101, 102 adapted to generate vibrations in ranges of frequency and/or identical or different amplitudes. A first vibrating actuator 101 can, for example, generate weak (or pleasant) vibrations, at a first range of frequency and/or amplitudes and the second vibrating actuator 102 of stronger (or unpleasant) vibrations, at a second range of frequency and/or amplitudes. These vibrating actuators allow to deliver to the player, "tremor" or "buzz"-type messages. The vibrating actuators 101, 102 can be activated simultaneously or alternatively according to the video game events. These vibrating actuators 101, 102 are of the known type, and consist, for example, of an electric motor of which the rotating shaft is provided with a counterweight or imbalance 1010, 1020. The vibrating actuators 101, 102 are controlled by the management unit 9. This controlling is done in response to the receiving of signals which can be the same as those initiating the controlling of the actuator 7 or different signals transmitted during other video game events.

Figure 5:
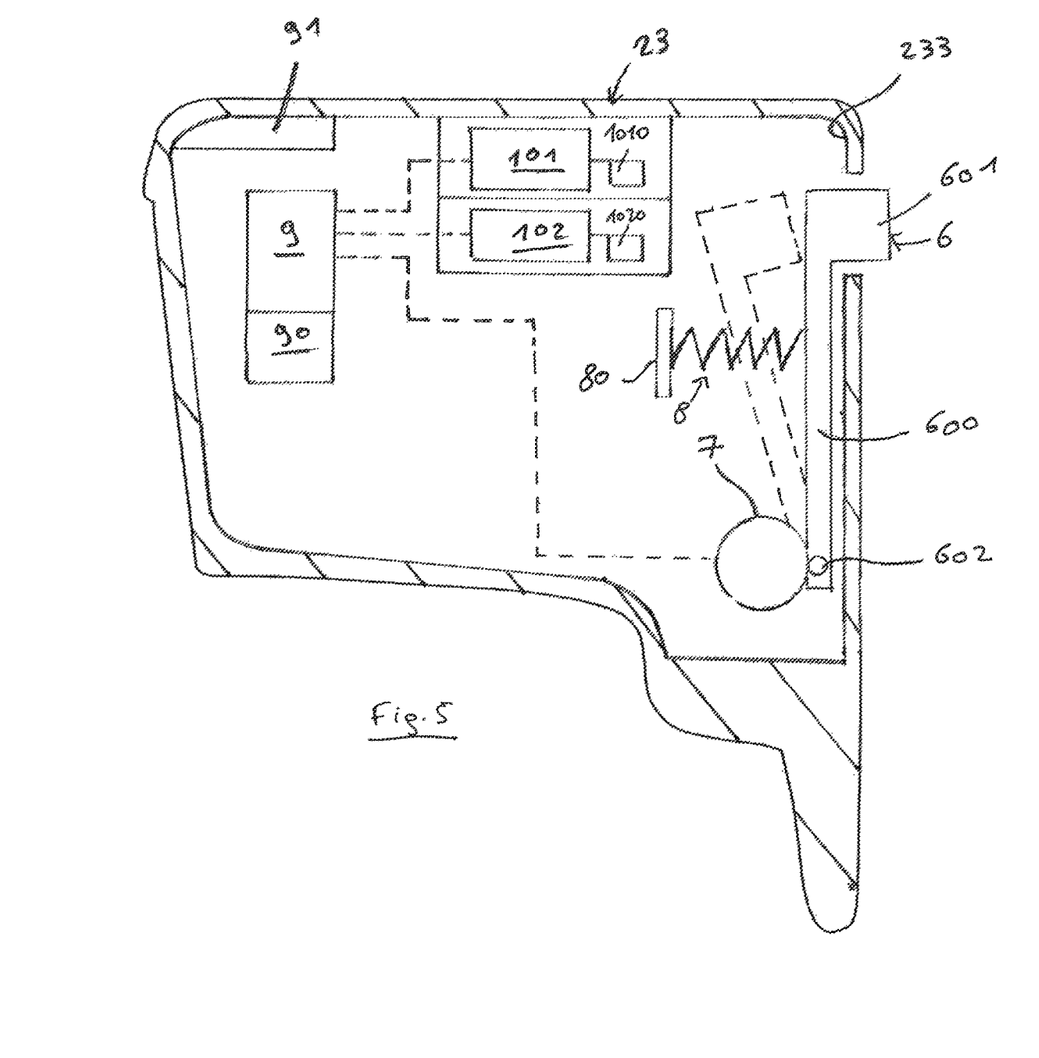
FIG. 5 is a schematic view of a feedback device according to an embodiment variant.

FIG. 5 illustrates an embodiment variant where the firing pin 6 is mounted mobile in rotation between the folding position (dotted line) and the advanced position (solid line). The firing pin 6 is presented here in the form of a hammer including a longitudinal portion 600 at the end of which is arranged an active portion 601 intended to impact the zone of the body of the player. The other end of the longitudinal portion 600 is provided with an axis of rotation 602. The actuator 7 is here a rotating actuator (for example, a rotating electric motor) of which the shaft is connected with the axis of rotation 602. The rotating of the actuator 7 by the management unit 9 leads to the pivoting of the firing pin 6 about the axis 602, between the folding position and the advanced position. However, it can be considered to use a linear actuator 7 of the type described above in reference to FIGS. 3 and 4, for example, with the piston 70 connected with the longitudinal portion 600. The spring 8 is arranged to maintain the firing pin 6 in advanced position when the butt 23 is not worn on the shoulder. It is, on the one hand, connected with the firing pin 6 and, on the other hand, connected with the abutment element 80.

As mentioned above, the force feedback device describes, in reference to the appended figures, can be integrated in other video game accessories. It can, in particular, be integrated in a controller or gamepad. In the case of a controller 40, 41 illustrated in FIGS. 1 and 2, the handle of said controller forms the casing wherein the firing pin is mounted. The latter thus impacts the palm the hand of the player.

An item of clothing can also be designed, adapted to be worn by the player (for example, a T-shirt, trousers, a combination, etc.) integrating several force feedback devices. The casings are thus directly integrated in the stitching of the clothing or in the thickness thereof. Several force feedback devices distributed over the item of clothing allowing to space apart several bullet impacts when the firing pins are in advanced position.

The arrangement of the different elements and/or means and/or steps of the invention, in the embodiments described above, must not be comprised as requiring such an arrangement in all the implementations. In any case, it will be understood that various modifications can be applied to these elements and/or means and/or steps. In particular:

The casing can be made from one or more parts. It is particularly advantageous to provide a casing with at least one removable portion enabling access to the different elements, installed inside said casing. In the appended figures, the rear portion 233 of the butt 23 is preferably removable.

The firing pin 6 can have a general square, spherical shape, etc.

The electro-piston 7 can be replaced by another linear actuator such as a mechanical or pneumatic actuator. In the latter case, the casing 23 can integrate a compressed air reserve allowing to move the piston 70.

The piston 70 can be moved by a rotating electric motor. Thus, a gear/pinion system allowing to transform the rotating movement of the shaft of the motor into a translation movement of the piston 70.

The spring 8 can be connected, on the one hand, with the firing pin 6 (and not with the rod of the piston 70), and on the other hand, connected with the abutment element 80.

The abutment element blocking the movement of the firing pin 6 when it reaches the advanced position can be positioned directly in the electro-piston 7 such that the movement of the piston 70 is directly blocked by an abutment arranged in the body of the coil 71. An abutment element can also be provided on the firing pin 6 and another abutment element in the electro-piston 7.

The active face 60 of the firing pin 6 can be covered with foam or with another similar rubber- or silicone-type material to dampen the impact of said firing pin on the zone of the body of the player.

The invention claimed is:

1. A holder for game pad for virtual reality video games, which holder is adapted to simulate a weapon in said games, which holder is equipped with a mechanical force feedback device designed to simulate the recoil of the weapon at the moment of a trigger pressure during a game event,
the force feedback device comprises:
a casing which, in use, is in physical contact with a zone of the body of the player, which casing is presented in the form of a butt shaped to be worn on the shoulder by a player,
a firing pin forming, in use, a physical contact with the zone of the body of the player,
wherein:
the firing pin is mounted mobile in the casing between:
a folding position, and
an advanced position where said firing pin projects from said casing to, in use, impact the zone of the body of the player,
a spring element is arranged to maintain the firing pin in advanced position when the casing is not in physical contact with the zone of the body of the player,
an actuator is arranged to move the firing pin between the folding position and the advanced position,
an electronic management unit is adapted to receive signals and, in response to the receiving of said signals, controlling the actuator, so as to only exert thrust pressures on the firing pin, which thrust pressures allow to make said firing pin pass from the folding position to the advanced position, and
in use, only the pressure exerted on the firing pin by the zone of the body of the player allows to make said firing pin pass from the advanced position to the folding position.

2. The holder according to claim 1, wherein in the folding position, the firing pin is retracted in the casing such that a front face of said firing pin is located in the same plane as the surface of a rear portion of the butt against which, in use, the shoulder of the player is flattened.

3. The holder according to claim 2, wherein the firing pin is provided with one or more abutment elements blocking the movement of said firing pin when it reaches the advanced position.

4. The holder according to claim 3, wherein the abutment element(s) are made of a rigid material and shut against a rear wall of the butt when the firing pin reaches the advanced position.

5. The holder according to claim 2, wherein the electronic management unit is adapted to detect the leading edges of the signals received by said unit and determines, according to a predefined configuration, the activation period of the actuator.

6. The holder according to claim 5, wherein the configuration of the activation period depends on the amplitude of the signals received by the electronic management unit.

7. The holder according to claim 6, wherein the configuration of the activation period depends on the frequency of the signals received by the electronic management unit.

8. The holder according to claim 2, wherein the firing pin is mounted mobile in rotation between the folding position and the advanced position.

9. The holder according to claim 2, including at least one of the following features:
- the actuator is controlled to exert a thrust force comprised between 10 N and 100 N;
- the articulation of the firing pin between the folding position and the advanced position is comprised between 1 mm and 5 mm;
- the actuator is an electro-piston.

10. The holder according to claim 2, wherein said holder is presented in the form of a stick, the butt being removably fixed onto said stick.

11. The holder according to claim 1, wherein the firing pin is provided with one or more abutment elements blocking the movement of said firing pin when it reaches the advanced position.

12. The holder according to claim 11, wherein the abutment element(s) are made of a rigid material and shut against a rear wall of the butt when the firing pin reaches the advanced position.

13. The holder according to claim 1, wherein the electronic management unit is adapted to detect the leading edges of the signals received by said unit and determines, according to a predefined configuration, the activation period of the actuator.

14. The holder according to claim 13, wherein the configuration of the activation period depends on the amplitude of the signals received by the electronic management unit.

15. The holder according to claim 14, wherein the configuration of the activation period depends on the frequency of the signals received by the electronic management unit.

16. The holder according to claim 1, wherein the firing pin is mounted mobile in translation between the folding position and the advanced position.

17. The holder according to claim 1, wherein the firing pin is mounted mobile in rotation between the folding position and the advanced position.

18. The holder according to claim 1, further including at least one of the following:
- the actuator is controlled to exert a thrust force comprised between 10 N and 100 N;
- the articulation of the firing pin between the folding position and the advanced position is comprised between 1 mm and 5 mm; and
- the actuator is an electro-piston.

19. The holder according to claim 1, wherein said holder is presented in the form of a stick, the butt being removably fixed onto said stick.

* * * * *